(12) United States Patent
Crawford

(10) Patent No.: US 6,360,879 B1
(45) Date of Patent: Mar. 26, 2002

(54) LOW PROFILE BELT CONVEYOR

(76) Inventor: George N. Crawford, 1661 St. Andrews Dr., Oakmont, PA (US) 15139

( * ) Notice: Subject to any disclaimer, the term of this patent is extended or adjusted under 35 U.S.C. 154(b) by 0 days.

(21) Appl. No.: 09/512,541

(22) Filed: Feb. 24, 2000

(51) Int. Cl.[7] ............................................. B65G 15/08
(52) U.S. Cl. ....................................... 198/823; 198/821
(58) Field of Search ................................ 198/823, 841, 198/821

(56) References Cited

U.S. PATENT DOCUMENTS

| | | | |
|---|---|---|---|
| 2,516,192 A | * 7/1950 | Ensinger | 198/823 X |
| 4,359,156 A | * 11/1982 | Austin | 198/823 X |
| 4,735,982 A | 4/1988 | Orndorff, Jr. | |
| 4,789,056 A | 12/1988 | Bourdeau | |
| 4,932,516 A | 6/1990 | Andersson | |
| 5,353,920 A | * 10/1994 | Szalankiewicz et al. | 198/823 |
| 5,799,780 A | 9/1998 | Steeb, Jr. et al. | |
| 5,826,703 A | 10/1998 | Altemus, Jr. et al. | |
| 5,988,360 A | * 11/1999 | Mott | 198/823 |

FOREIGN PATENT DOCUMENTS

| | | | | |
|---|---|---|---|---|
| GB | 2188018 | * | 9/1987 | 198/823 |
| JP | 3-13410 | * | 1/1991 | 198/823 |

* cited by examiner

*Primary Examiner*—James R. Bidwell
(74) *Attorney, Agent, or Firm*—David W. Brownlee; Eckert Seamans Cherin & Mellott, LLC

(57) ABSTRACT

A low profile belt conveyor having at least one idler assembly that includes a trough shaped support plate and wear plates made of low friction material such as high molecular weight polyethylene on the wear plate.

14 Claims, 4 Drawing Sheets

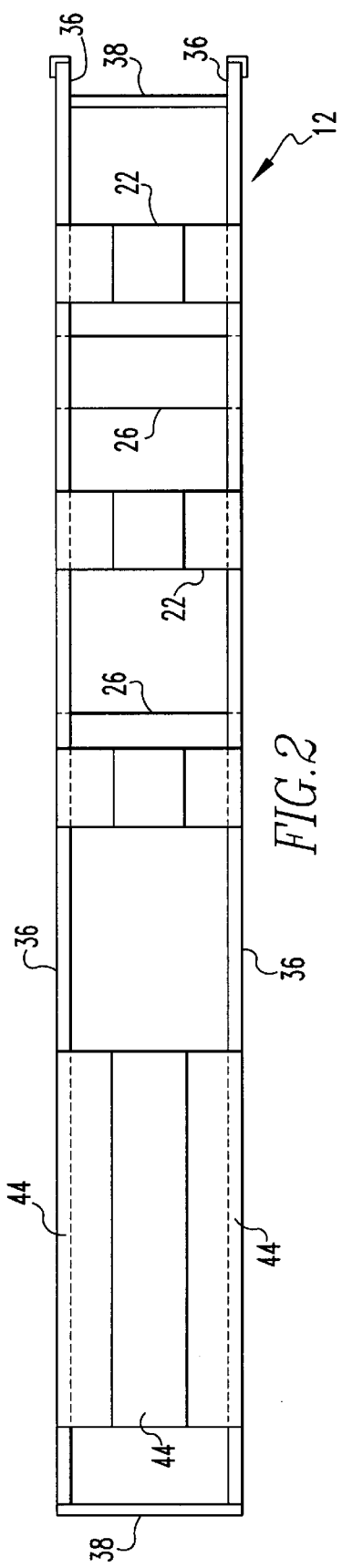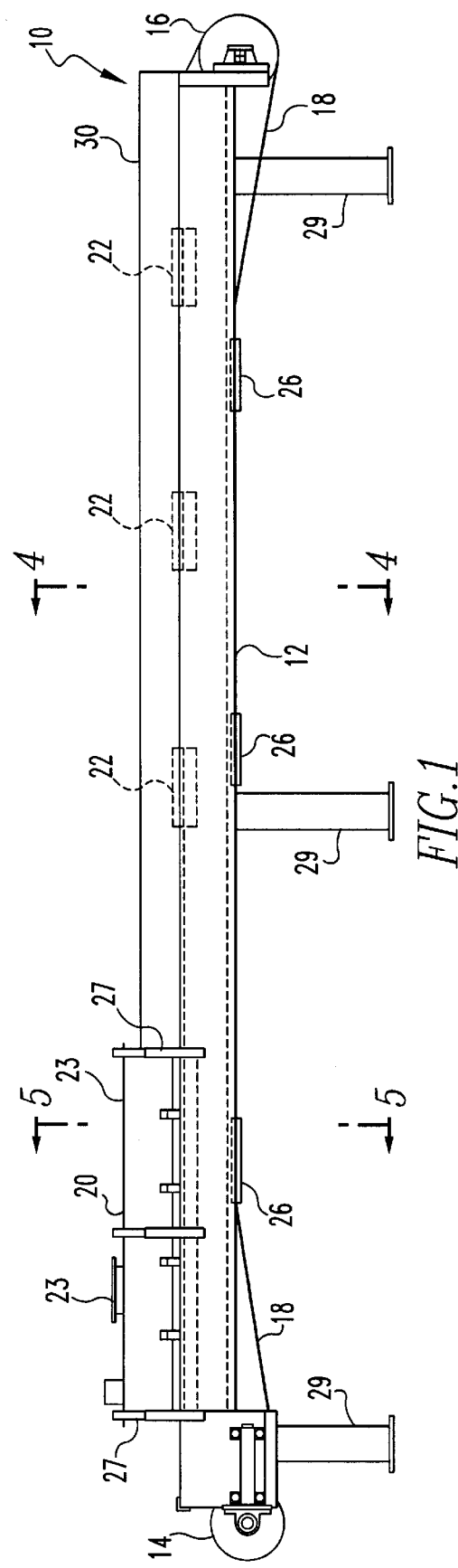

LOW PROFILE BELT CONVEYOR

BACKGROUND OF THE INVENTION

This invention relates to a belt conveyor and in particular to a low profile belt conveyor.

Belt conveyors are used to convey numerous commercial and agricultural products such as coal, metal, metal ores, scrap materials, grains and the like. The conveyors typically comprise a frame, pulleys on opposite ends of the frame and a continuous belt that runs around the pulleys and along the length of the conveyor frame. The belt is in the form of a loop with an upper travel portion, which carries product on its upper surface, and a return lower travel below and generally parallel to the upper travel. Belt conveyors may be disposed substantially horizontally or may be disposed at an angle to horizontal to move product upwardly as well as laterally.

Most belt conveyors include one or more idler assemblies for supporting the belt from excessive sagging between the pulleys. Idler assemblies may be used to support both the upper and lower travel portions of the belt. The weight of product on the upper travel portion will typically cause the belt to sag in the middle along at least a portion of the length of the upper travel portion. Idler assemblies for the upper travel portion of belts are therefore typically trough or U-shaped to generally match the longitudinal sag in the belt. Idler assemblies for the lower travel portions of the belts are typically straight since the lower travel portion doesn't carry product and does not sag like the upper travel portion.

Most idler assemblies for belt conveyors comprise idler rollers mounted on generally U-shaped idler frames that are secured on the top of the conveyor frame. A plurality of rollers are typically configured in a trough within the idler frame for supporting the upper travel of the belt. The idler assemblies are spaced along the length of the conveyor to provide a plurality of spaced apart supports for the belt. The idler rollers are typically mounted on axle and bearings assemblies so the rollers can freely rotate under the belt with little friction between the belt and the rollers. As is well known in the art, the rollers in such idler assemblies are prone to malfunction and are difficult to maintain and repair.

It is known to provide idler assemblies that include wear bars, instead of rollers, for supporting the belt as is disclosed in U.S. Pat. Nos. 4,789,056; 4,932,516; 5,799,780; and 5,826,703. The wear bars are made of a material having a relatively low coefficient of sliding friction with the conveyor belt. The use of such low friction wear bars eliminates moving parts from the idler assemblies and simplifies repair and replacement of the wear members, among other advantages. The idler assemblies disclosed in the patents include generally U-shaped frames so the idler assemblies can be retrofitted onto existing conveyors.

An improved belt conveyor is needed that is more compact and less expensive to manufacture. A conveyor is also needed that has improved mounting of low friction wear pads in the idler assemblies to facilitate maintenance, repair and replacement of the pads.

SUMMARY OF THE INVENTION

This invention provides an improved low profile belt conveyor having idler assemblies that use low friction slider pads for supporting the conveyor belt. The conveyor can be substantially horizontal or can be disposed at an angle to horizontal to carry product along the conveyor. The conveyor includes a frame having parallel side stringers, pulleys on opposite ends of the frame, and an endless belt for conveying product. It further includes at least one idler assembly having low friction slider pads on it for supporting an upper travel portion of the belt that carries product. The idler assembly is secured to the side stringers and forms a trough between the side stringers for the belt to fit into as it sags under the weight of the product. The trough is generally below the top of the frame so that the conveyor has a low profile that will conserve space and not interfere with other equipment or structural overhangs.

In a preferred embodiment of this invention, the slider pads are made of ultra high molecular weight polyethylene such as Tivar® 1000 material that is available form Solidur Plastics Company, Pittsburgh, Pa.

The slider pads are preferably mounted on trough shaped steel support plates that are secured to the top of the side stringers. The slider pads are bolted to the steel support plates through countersunk holes in the support pads and matching holes in the steel plates. The holes in slider pads and plates are preferably oversized to accommodate differences between the thermal expansion of the polymer slider pads and the steel plates.

Accordingly, it is an object of this invention to provide an impruved low profile belt conveyor that has idler assemblies with slider pads made of low friction material to support the conveyor belt.

It is a further object to provide a low profile belt conveyor that is more flexible in its positioning and use.

Another object of this invention is to provide a belt conveyor having low friction slider pads in its idler assemblies. Such slider pads have low coefficients of sliding friction with the conveyor belts and are wear resistant and durable. The improved slider pads eliminate moving parts in the idler assembly and therefore reduce maintenance. The material of the slider pads is also self-lubricating, resistant to attack by harsh chemicals, and exhibits essentially zero water absorption.

Other objects and advantages of this invention will be more fully understood and appreciated by reference to the following description of preferred embodiments and to the attached drawings.

BRIEF DESCRIPTION OF THE DRAWINGS

FIG. 1 is a side elevational view of a belt conveyor of this invention.

FIG. 2 is a top plan view of the frame portion of the conveyor of FIG. 1.

DESCRIPTION OF THE PREFERRED EMBODIMENTS

Figure 3:
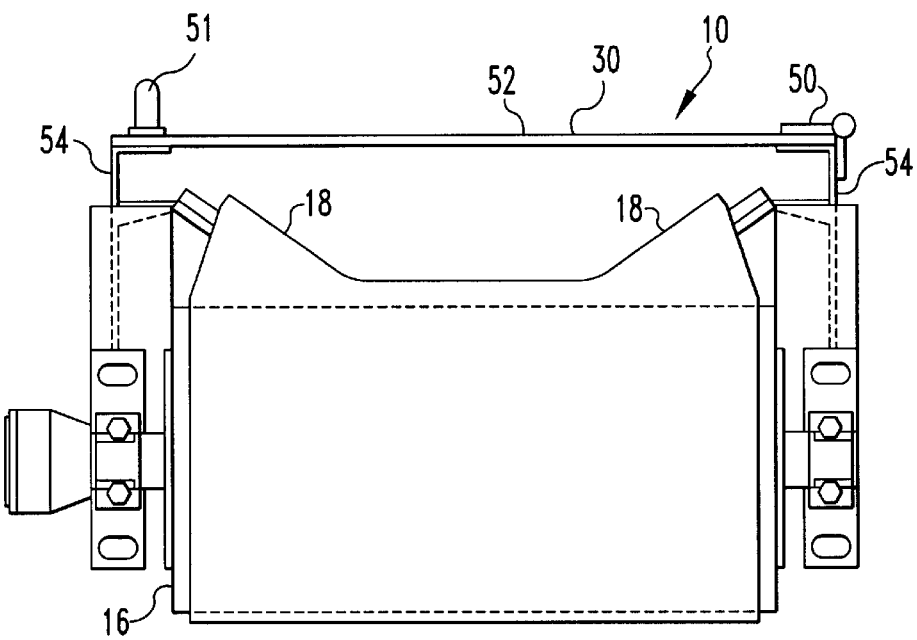
FIG. 3 is an end view of the conveyor of FIGS. 1 and 2.
Figure 4:
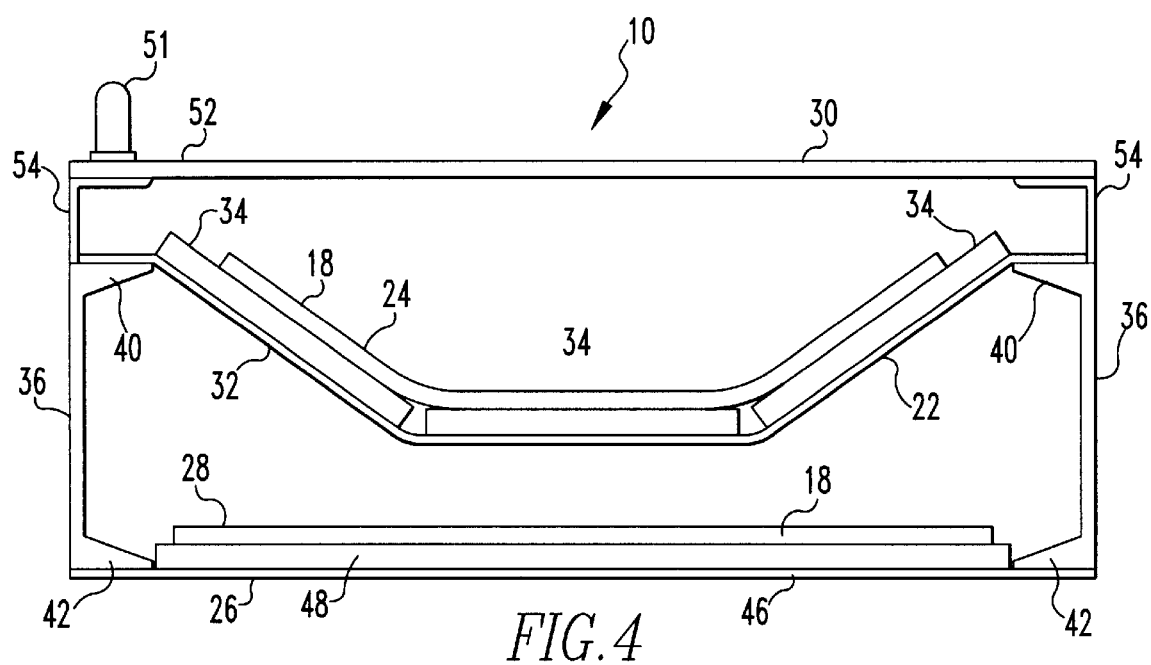
FIG. 4 is a cross-sectional view of the conveyor of FIG. 1 taken along line 4—4 of that figure.

FIGS. 1, 3, 4 and 5 show a belt conveyor 10 of this invention that includes a frame 12, pulleys 14 and 16 on opposite ends of the frame, a belt 18, a load station 20, three idler assemblies 22 under the upper travel portion 24 of the belt, and three return idler assemblies 26 under the return travel portion 28 of the belt. FIG. 2 shows the frame 12 of the conveyor 10 without the belt 18, pulleys 14, 16, load station 20 and lower idler assemblies 26. The frame includes spaced apart side stringers 36 and transverse end members 38. It may also include diagonal bracing, not shown. As shown in FIG. 1, two or more support assemblies 29 may be provided to support the conveyor 10 on a factory floor or other base, not shown. The conveyor 10 could be alternatively hung from an overhead support means or be otherwise supported in a factory or other structure. At least one of the pulleys 14 and 16 is a drive pulley for moving the belt 18. The other pulley 14 or 16 can be an idler pulley or also a drive pulley. The conveyor may also have a cover assembly 30 over the belt 18 as is best seen in FIGS. 3 and 4.

Figure 5:
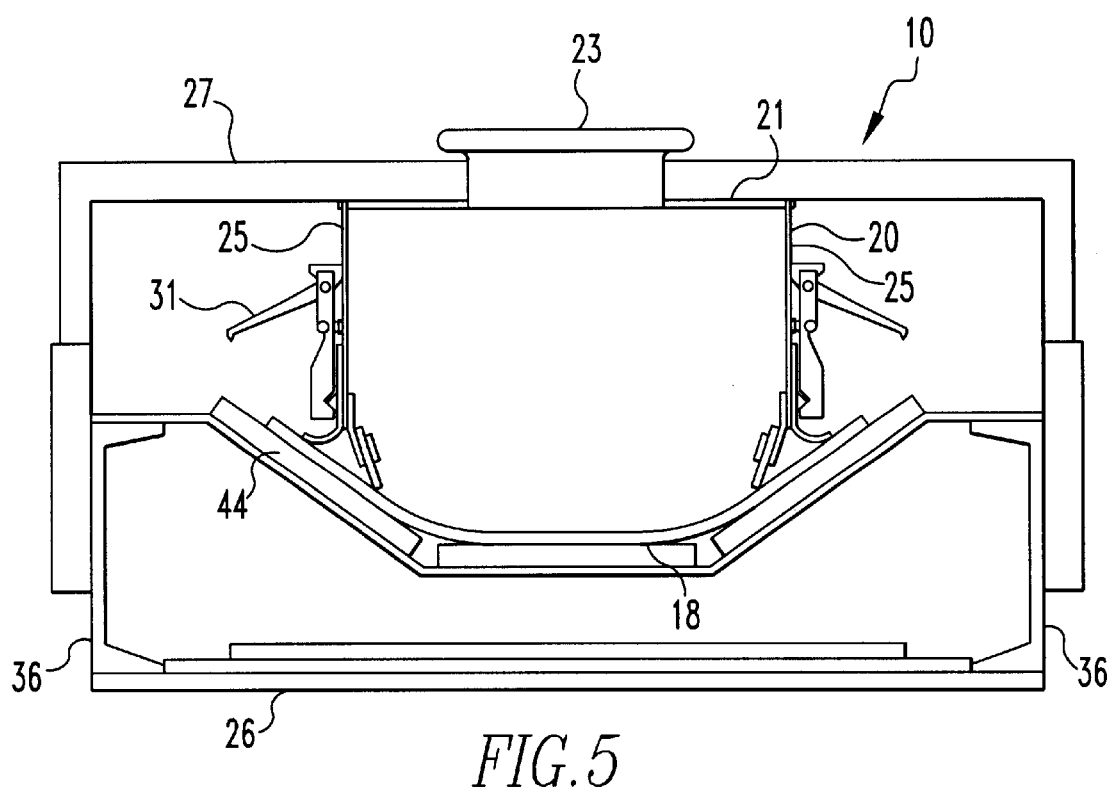
FIG. 5 is a cross-sectional view of the conveyor of FIG. 1 taken along line 5—5 of that figure.

The load station 20, as best seen in FIG. 5, is conventional in the art and is not unique to this invention. The station 20 may include a top 21 with a feed opening 23 in it and a dust seal hopper assembly 25 with quick latches 31 for retaining product on the belt 18. Product to be conveyed may be granular or powder like. Slider bed supports 44 may be provided under the belt at the load station as is disclosed in U.S. Pat. No. 4,789,056, which is assigned to Solidur Plastics Company. U-shaped hold down brackets 27 may be secured to the side stringers 36 and over the top of the feed station 20 to secure it on the conveyor 10.

The conveyor 10 has at least one, and more preferably at least three, idler assemblies 22 under the upper travel portion of the belt 18. The number of idler assemblies 22 depends on the length of the conveyor 10, the width of the belt 18, and the nature (weight) of the product to be conveyed, among other factors. The belt 18 may be a conventional two or three ply rubber/polyester/nylon belt of the type well known in the art.

In accordance with this invention, the idler assemblies 22 comprise slider support plates 32 having slider pads 34 made of low friction material, such as ultra high molecular weight polyethylene, secured to the plates (FIG. 4). The slider plates 32 and pad 34 are mounted in the frame 12 approximately at or below the top of the side stringers 36 so the conveyor 10 will have a low profile. The low profile of the conveyor means that the vertical height of the conveyor, excluding the load station 20 and cover 30, is preferably less than about 30 inches, and more preferably less than about 20 inches. The low profile of the conveyor 10 conserves on space, permits use of the conveyor in close quarters and generally makes the conveyor more user friendly.

The upper idler assemblies 22 are spaced apart along the length of the frame to provide support for the belt 18 under the weight of product being carried on the belt. Each idler assembly preferably includes three wear pads 34 on plate 32 as is further described below. The wear pads 34 may be rectangular and have a width along the length of the conveyor that is at least about 6 inches, and preferably about 10 inches. The optimum width of the pads 34 depends on the spacing between idler assemblies 22 and the amount of support desired for the belt 18.

FIG. 4 is a cross-section through the conveyor of FIG. 1 and shows one of the upper idler assemblies 22 supported on an upper flange 40 on each of the side stringers 36. It also shows one of the lower idler assemblies 26 secured to lower flanges 42 on the side stringers 36. As seen in FIG. 4, each upper idler assembly 22 has a trough shape to support the belt 18, which will also have a trough shape due to the weight of product, not shown, carried by the belt. Each idler assembly 22 includes a trough-shaped support plate 32 and slider pads 34 secured to the support plate. The support plate 32 can be secured to the upper flanges 40 with bolts, screws or the like, not shown. The slider pads 34 are secured to the support plate 32 by screws, bolts or the like as is described below.

The lower idler assemblies 26 also each preferably includes a metal support plate 46 and at least one slider pad 48 secured on top of the support plate. The lower idler assemblies 26 may be straight across instead of trough shaped since the lower travel portion of the belt 18 does not carry product and therefore has little or no sag across its width.

As best seen in FIG. 4, the spacing between the upper travel portion 24 and lower travel portion 28 of the belt 18 is small, preferably less than about 6 inches between the bottom of the trough in the upper travel and the middle of the lower travel. This means that vertical height of the conveyor 10 can also be small as is discussed above. The small spacing between the upper and lower travel portions 24 and 28 is enabled in part by the use of idler assemblies that include no moving parts, and to the novel mounting of the slider pads on the support plates. The support plates 32 and low friction slider pads 34 of this invention occupy little space and require little maintenance. They can also be easily removed, repaired and replaced. It's a simple matter to unbolt the idler assemblies 22 and/or 26 from the side stringers 36 to replace and/or repair the assemblies.

FIGS. 3 and 4 show a cover assembly 30 on the conveyor 10 to contain dust and help prevent material from being scattered off the belt 18. The cover assembly 30 may comprise sheets 52 of Plexiglas®, sheet metal, metal grating, or the like secured over the conveyor 10 by means of rails 54. The cover 30 may also be hinged to the conveyor 10 along the length of the cover or for a short section or sections of the cover. FIG. 3 shows a hinge 50 between rail 54 and cover sheet 52, and a handle 51 to facilitate opening the cover sheet.

Figure 6:
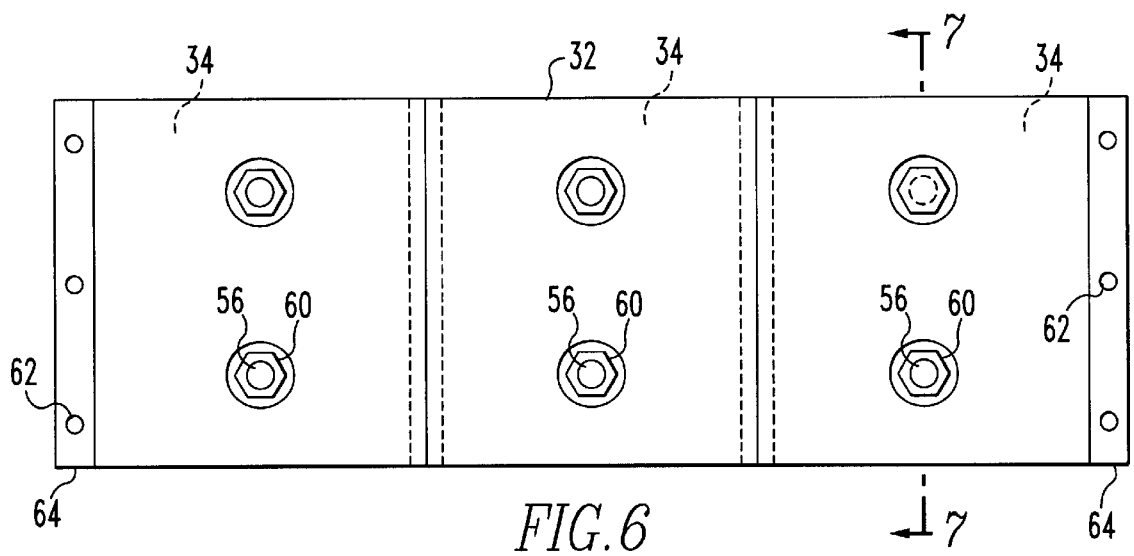
FIG. 6 is a bottom plan view of an idler assembly of this invention.
Figure 7:
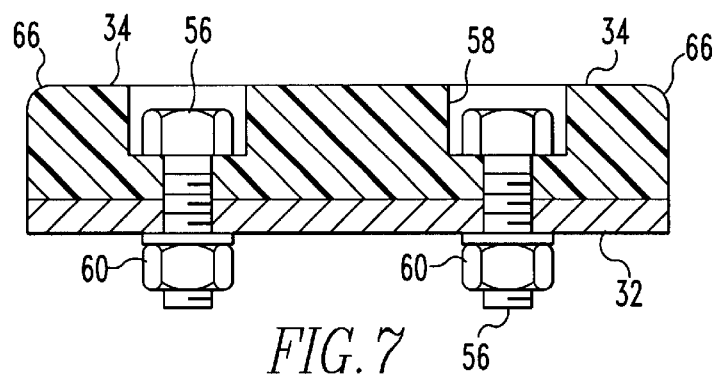
FIG. 7 is an enlarged cross-sectional view through the idler assembly of FIG. 6 showing a cap screw attachment of a slider pad to the supporting plate.

FIGS. 6 and 7 show an upper idler assembly 22 of this invention and a preferred attachment of the slider pads 34 to the support plate 32. The slider pads 34 are preferably made of Tivar 1000® polyethylene which is an ultra high molecular weight polyethylene sold by Solidur Plastics Company in Pittsburgh, PA. but may be made of other low friction materials such as Teflon®, nylon or the like. The top front and rear edges 66 of the slider pads 34 are preferably rounded as shown in FIG. 7 to provide a smooth corner for a belt 18 to ride over as it slides over the pads. The pads 34 are preferably about ¾ inch thick and about 10 inches long (parallel to belt travel) by about 6¾ inches wide. The plate 32 may be about ⅛ inch (10 gauge) thick.

The slider pads 34 are preferably attached to support plates 32 by several cap screws 56 and nuts 60 as seen in FIG. 7. The pads 34 may have holes 58 countersunk in them for receiving the cap screws 56 and may have caulking or polymer resin, not shown, in the holes over the cap screws. The holes 58 in the pads 34 and/or plates 32 are preferably oversized to permit the wear pads to expand and contract relative to the metal support plate 32. Polyethylene has a substantially higher coefficient of thermal expansion than does the steel or other metal of the support plates 32, and the oversized holes permit movement between the pads 34 and plate 32 with changes in temperature. The slider pads 48 on the lower idler assemblies 26 are preferably secured on their support plates 46 in a similar manner. The slider pads 34 and 48 can optionally be also adhesively bonded to the support plates 32 and 46. The support plates 32 may have holes 62 in side flanges 64 for securing the idler assemblies to the side stringers 36.

It is therefore seen that this invention provides an improved low profile belt conveyor with idler assemblies that have low friction slider pads mounted on metal support plates. The conveyor of this invention is more robust than prior conveyors and also more user friendly and convenient to use and repair. The idler assemblies in the conveyor have no moving parts and provide a more compact and efficient use of space. It is a particular feature of this invention that the idler assemblies that support the upper travel of the belt are located between the side stringers of the conveyor so the conveyor has a low profile.

A preferred embodiment of the invention has been selected for illustration and description. It will be appreciated by those skilled in the art that numerous modifications can be made to the preferred embodiment without departing from the invention or the scope of the claims appended hereto.

What is claimed is:

1. A low profile belt conveyor comprising:

an elongate frame including a pair of spaced apart, side stringers, each of which has a top edge portion along its length;

an endless conveyor belt having an upper substantially horizontal travel and a lower return travel spaced below said upper travel and forming an endless loop therewith;

pulleys on opposite ends of said elongate frame supporting said belt and permitting travel of the belt in said loop, at least one of said pulleys being a drive pulley for driving said belt in said loop;

at least one trough-shaped upper idler assembly under said upper travel of said conveyor belt for supporting said belt in said upper travel, said idler assembly comprising a metal support plate between said side stringers and secured to top edge portions of the stringers and with most of the support plate disposed below said top edge portions of the stringers and at least three slider pads made of low friction material on the support plate for supporting said upper travel of the belt in said trough, with one of said pads disposed centrally in said trough below the top edge portions of said side stringers; and at least one return idler assembly secured to lower portions of said side stringers for supporting said return travel of said belt above the bottom of said side stringers and said at least one return idler has at least one slider pad made of low friction material for supporting the return travel of said belt.

2. A belt conveyor as set forth in claim 1 in which each of said at least one upper idler assembly includes at least two idler assemblies.

3. A belt conveyor as set forth in claim 1 in which each of said three slider pads includes a first pad disposed generally horizontally in the bottom of said trough and second and third pads angled upwardly away from opposite ends of said first pad.

4. A belt conveyor as set forth in claim 3 in which each of said slider pads is generally rectangular and has a length of at least about 6 inches parallel to the travel of said belt.

5. A belt conveyor as set forth in claim 4 in which said length is about 10 inches.

6. A belt conveyor as set forth in claim 1 in which said upper travel and said lower travel of said belt are spaced apart not more than about 16 inches at a midpoint along the length of said conveyor.

7. A belt conveyor as set forth in claim 1 in which said slider pad is made of ultra high molecular weight polyethylene.

8. A low profile belt conveyor comprising:

an elongate frame that includes parallel side stringers;

an endless conveyor belt having a substantially horizontal upper travel and a lower return travel spaced below said upper travel and forming a loop therewith;

pulleys in opposite ends of said frame for supporting said belt and permitting the belt to travel in said loop, at least one of said pulleys being a drive pulley;

at least two idler assemblies under said upper travel, spaced apart along the length of said upper travel, each said idler assembly including a support plate and at least three slider pads on it for supporting said belt in its upper travel, said slider pads being disposed end-to-end in the shape of a trough, said trough having outer edge portions disposed at approximately the upper edge of each of said side stringers, and each of said slider pads having a length of at least about 8 inches parallel to the travel of said belt; and at least one return idler assembly under said return travel of said belt, with said return idler assembly attached to lower edge portions of said side stringers. and having at least one low friction slider pad on a support plate for supporting said belt near the bottom of said side stringers.

9. A conveyor as set forth in claim 8 in which said slider pads are made of Tivar® polyethylene.

10. A conveyor as set forth in claim 8 that includes a cover mounted on said frame and spaced over said upper travel of said belt.

11. A conveyor as set forth in claim 8 in which said slider pads have a coefficient of friction not more than 0.20.

12. A conveyor as set forth in claim 8 in which said slider pads have a coefficient of friction of about 0.10.

13. In a belt conveyor having an elongate frame that includes a pair of side stringers, pulleys on opposite ends of the frame, and an endless belt on said pulleys, said belt having an upper travel portion and a return travel portion, the improvement comprising at least one trough-shaped, upper idler assembly for supporting the upper travel portion of said belt between said pulleys, with said at least one idler assembly disposed mostly below upper surfaces of the stringers and including at least three slider pads made of low friction high molecular weight polyethylene on said slider assembly, said conveyor further having at least one return idler assembly secured to and disposed between lower edge portions of said stringer and having at least one low friction slider pad on it for supporting said return travel portion of said belt.

14. A belt conveyor as set forth in claim 13 which includes at least two upper idler assemblies and at least two return idler assemblies.

* * * * *